(12) United States Patent
Dohi

(10) Patent No.: US 11,620,094 B2
(45) Date of Patent: Apr. 4, 2023

(54) STORAGE MEDIUM, CONTROL METHOD, AND MANAGEMENT SYSTEM

(71) Applicant: CANON KABUSHIKI KAISHA, Tokyo (JP)

(72) Inventor: Makoto Dohi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 244 days.

(21) Appl. No.: 17/082,785

(22) Filed: Oct. 28, 2020

(65) Prior Publication Data

US 2021/0132877 A1 May 6, 2021

(30) Foreign Application Priority Data

Oct. 31, 2019 (JP) .............................. JP2019-199102

(51) Int. Cl.
| | |
|---|---|
| *G06F 9/46* | (2006.01) |
| *G06F 3/12* | (2006.01) |
| *G06F 9/48* | (2006.01) |
| *G06F 9/38* | (2018.01) |
| *G06F 9/54* | (2006.01) |

(52) U.S. Cl.
CPC .......... *G06F 3/1229* (2013.01); *G06F 3/1237* (2013.01); *G06F 9/3836* (2013.01); *G06F 9/4843* (2013.01); *G06F 9/4893* (2013.01); *G06F 9/54* (2013.01); *G06F 2209/503* (2013.01)

(58) Field of Classification Search
CPC . G06F 9/4843; G06F 9/4893; G06F 2209/503
See application file for complete search history.

(56) References Cited

U.S. PATENT DOCUMENTS 10,163,065 B1 * 12/2018 Koski ................ G06Q 10/1097

FOREIGN PATENT DOCUMENTS

| CN | WO 2011131065 | * 10/2011 | ......... H04L 43/0817 |
| CN | 109983748 A | * 7/2019 | ........... H04L 12/281 |
| JP | 2014106834 A | 6/2014 | |
| KR | 20130066259 A | * 6/2013 | ............. H04L 67/10 |

* cited by examiner

*Primary Examiner* — Diem K Cao
(74) *Attorney, Agent, or Firm* — Canon U.S.A., Inc. IP Division

(57) ABSTRACT

The present disclosure is characterized by: transmitting a command executing a task to plural devices to be managed; and checking a status of a device in case where a task to be executed in the device is a predetermined task being likely to cause a system error in the device, wherein a command executing the predetermined task is transmitted to a first device determined to be in a state where the predetermined task is executable, among the plural devices, without transmission of a command causing the device to be in the state where the predetermined task is executable, and wherein the command executing the predetermined task is transmitted to a second device determined to be in a state where the predetermined task is not executable, among the plural devices, after transmission of the command causing the device to be in the state where the predetermined task is executable.

13 Claims, 10 Drawing Sheets

| ID | NAME | ADDRESS | STATUS | MAC ADDRESS |
|---|---|---|---|---|
| 1 | MFP001 | 192.168.100.1 | DeepSleep | 10-E7-C6-2B-DA-01 |
| 2 | MFP002 | 192.168.200.4 | Sleep | 00-50-56-C0-00-01 |
| 3 | LBP010 | 192.200.10.1 | Running | 00-50-56-C0-00-08 |
| 4 | MFP0100 | 200.10.0.128 | WakeUp | 02-15-BE-80-C5-AE |
| 5 | MFP999 | 172.29.50.35 | Error | 20-A7-C6-2B-DA-01 |
| 6 | LBP5000 | 100.0.10.1 | Sleeping | 03-16-BC-70-C5-AE |
| 7 | MFP8000 | 192.172.80.20 | Shutdown | 01-30-5A-D0-00-09 |
| 8 | MFP9999 | 172.24.35.75 | Unknown | 10-60-86-C0-00-01 |
| ... | | | | |
| max | ... | ... | ... | ... |

FIG.7A

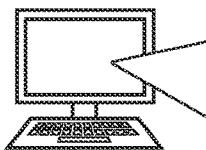

■ Create task

■ Please select task-execution target device (multiple selections allowed).
☐ ID:1/name:MFP001/address:192.168.100.1
☐ ID:2/name:MFP002/address:192.168.200.4
☐ ID:3/name:LBP010/address:192.200.10.1
☐ ID:4/...
☐ ID:5/...
☐ ...

■ Please select one task to be executed for above device.
☐ Distribute setting information
☐ Acquire setting information
☐ Distribute address book
☐ Acquire address book
☐ Add section management information
☐ Delete section management information
☐ ...

[OK] [Cancel]

FIG.7B

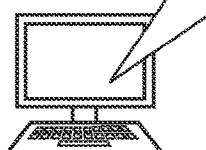

■ Task execution screen 1

■ Execute task for target device below.
   ID:1/name:MFP001/address:192.168.100.1
   ID:2/name:MFP002/address:192.168.200.4
   ID:3/name:LBP010/address:192.200.10.1

Task to be executed
    Add section management information

☐ Please press "next" if correct.

[Next] [Return]

FIG.7C

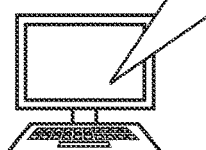

■ Task execution screen 2

■ Please select execution time of task.
☐ Execute immediately
☐ Execute in specific time
    Date (YYYY/MM/DD) [       ]
    Time (HH/MM)      [       ]

☐ Please press "OK" to execute task.

[OK] [Return]

FIG.8A

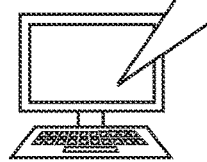

- Executing task
- Executed task for devices below
  ID:1/name:MFP001/address:192.168.100.1
  ID:2/name:MFP002/address:192.168.200.4
  ID:3/name:LBP010/address:192.200.10.1

Task to be executed
  Add section management information

FIG.8B

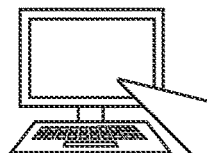

- Executing task (starting up device)
- Executing task for devices below
  ID:1/name:MFP001/address:192.168.100.1
  ID:2/name:MFP002/address:192.168.200.4
  ID:3/name:LBP010/address:192.200.10.1

Task to be executed
  Add section management information

- Starting up two devices

| ID | NAME | ADDRESS | MAC ADDRESS | TASK EXECUTION FLAG |
|---|---|---|---|---|
| 1 | MFP001 | 192.168.100.1 | 10-E7-C6-2B-DA-01 | ON |
| 2 | MFP002 | 192.168.200.4 | 00-50-56-C0-00-01 | OFF |
| 3 | LBP010 | 192.200.10.1 | 00-50-56-C0-00-08 | OFF |
|  |  |  |  |  |

901

STORAGE MEDIUM, CONTROL METHOD, AND MANAGEMENT SYSTEM

BACKGROUND OF THE DISCLOSURE

Field of the Disclosure

The aspect of the embodiments relates to a storage medium, a control method, and a management system for transmitting a command for executing a task to a plurality of management target devices.

Description of the Related Art

There is a device management application for medium-scale/large-scale offices which provides centralized management of information on a device and information on a user using the device. The device management application is configured to manage pieces of information on a plurality of devices and pieces of information on a plurality of users and to, at the same time, command the managed devices to execute a task. Specifically, a device application transmits a device setting value (i.e., time information to be set in the device, etc.) to the devices (that is, imports the setting value to the devices) simultaneously so that the setting value is applied to each of the devices.

Some devices have a mechanism that lowers the power of its own to a bare minimal level when printing processing, the above-described importing processing or other processing has not been performed continuously for a certain period of time. The state where the power is lowered to the bare minimum is generally called a power saving mode or a deep sleep mode. Once the device enters the power saving mode, the power saving status is maintained until a command for executing a task (e.g., the above-described importing processing) is received from the device management application.

When the device receives the command for executing the task (e.g., importing processing or printing processing) from the device management application, the device transitions from the power saving mode to a standby status and then executes processing in accordance with the received command Typically, most of the functions of the device are in an inactive state while the device is in the power saving mode, so that it takes a certain period of time for the device to return from the power saving mode to the standby status, which keeps the user of the device waiting. When the device executes processing in accordance with a command while the device is transitioning from the power saving mode to the standby status, there is a possibility that an error will occur in the device.

Japanese Patent Application Laid-Open No. 2014-106834 discusses a technique in which, before a user gives a command to transmit a print job, a personal computer (PC) transmits a command to disable the power saving mode to a printing apparatus in response to display of a print screen. This allows the printing apparatus to receive and execute the print job in a state where the power saving mode is disabled.

According to the technique discussed in the above-described Japanese Patent Application Laid-Open No. 2014-106834, the PC transmits the command to disable the power saving mode to the printing apparatus without considering the status of the printing apparatus. That is, the command to disable the power saving mode is transmitted even when the printing apparatus is not in the power saving mode (e.g., the standby status), which results in unnecessary processing.

As described above, a management system in which a device management application operates transmits a command for executing a task to a plurality of devices to be managed. Tasks executed by a device include a predetermined task that can cause an error in the device if the task is executed when the device returns from sleep. Before transmitting a command for executing such a predetermined task, if the management system uniformly transmits, to each of the devices, a command for causing the device to be in a state capable of executing the task without considering the status of the device, a lot of unnecessary processing may occur. This is because the command for causing a device to be in a state capable of executing the predetermined task is also transmitted to a device that is already in the status allowing execution of the predetermined task.

SUMMARY OF DISCLOSURE

The present disclosure is characterized by a non-transitory computer readable storage medium on which is stored a computer program for making a computer execute a method comprising: transmitting a command for executing a task to a plurality of devices to be managed; and checking a status of a device in a case where a task to be executed in the device is a predetermined task that is likely to cause a system error in the device, wherein a command for executing the predetermined task is transmitted to a first device determined to be in a state where the predetermined task is executable, among the plurality of devices, without transmission of a command for causing the device to be in the state where the predetermined task is executable, and wherein the command for executing the predetermined task is transmitted to a second device determined to be in a state where the predetermined task is not executable, among the plurality of devices, after transmission of the command for causing the device to be in the state where the predetermined task is executable.

Further features of the disclosure will become apparent from the following description of exemplary embodiments with reference to the attached drawings.

BRIEF DESCRIPTION OF THE DRAWINGS

FIGS. 7A, 7B and 7C illustrate screens presented by the management application on a display of the server before a task is executed.

FIGS. 8A and 8B illustrate screens presented by the management application on the display of the server when a task is executed.

FIG. 9 illustrates a task-execution target device list.

DESCRIPTION OF THE EMBODIMENTS

Embodiments for carrying out the present disclosure will be described below with reference to the drawings.

Figure 1:
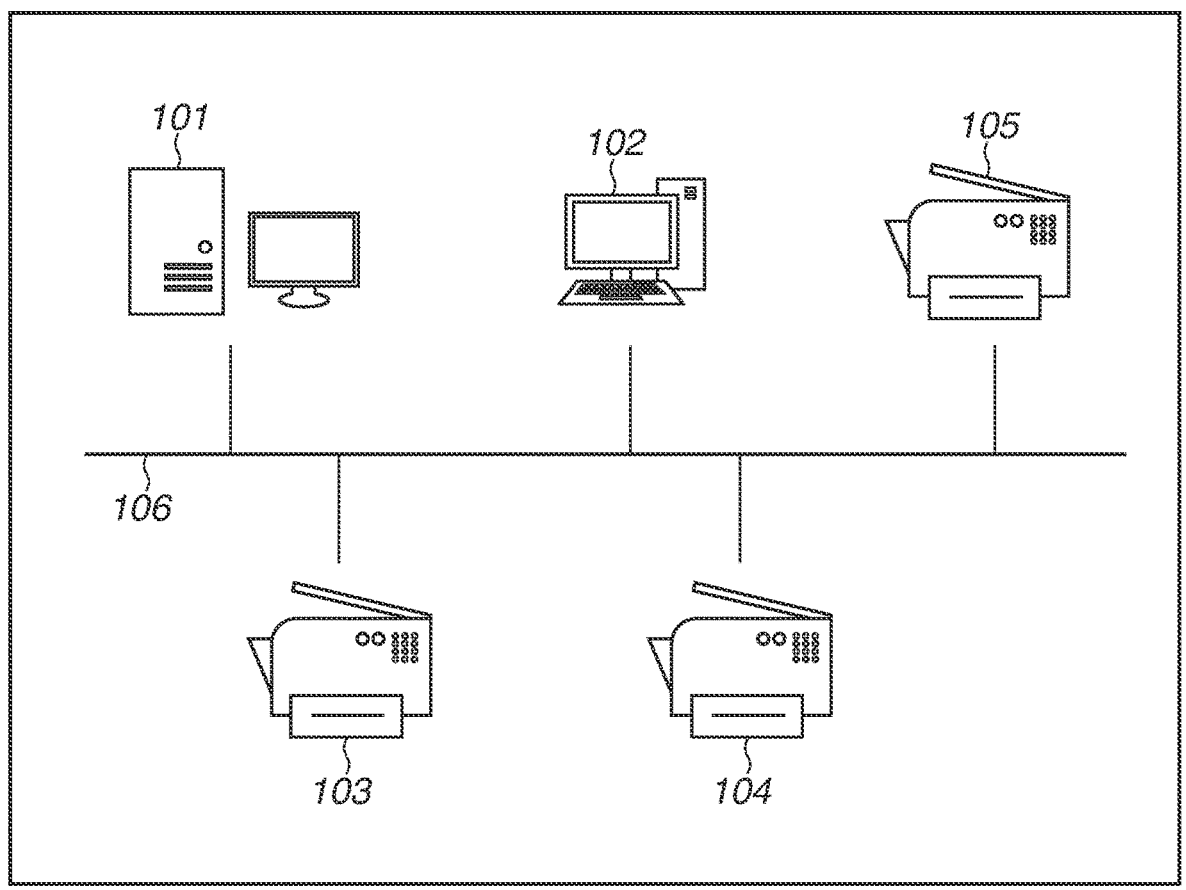
FIG. 1 is a diagram illustrating an example of a system configuration according to an exemplary embodiment of the present disclosure.

FIG. 1 is a diagram illustrating an overall view of a system including a server in which a device management application (hereinafter referred to as "management application") operates.

A server 101 executes the management application according to the present exemplary embodiment as a web service. Hereinafter, the management application refers to a management application executed (operating) on the server 101 unless otherwise described. According to the present exemplary embodiment, a management system may be the server 101 in which the management application is executed or a system using a server-less technology, such as AWS Lambda.

A client personal computer (PC) 102 accesses the management application as a client and can operate the management application.

Devices 103 to 105 are multifunction peripherals. The devices are target devices to be managed by the management system.

The server 101 and the client PC 102 can use various functions of the devices, such as executing printing by transmitting print jobs to the devices 103 to 105.

A network 106 is, for example, an intranet or a local area network (LAN).

The server 101, the client PC 102, and the devices 103 to 105 are connected to the network 106 and can transmit and receive information to/from each other.

The network 106 may be a wired system or a wireless system, such as Wireless Fidelity (Wi-Fi) (registered trademark), or may be a public network, such as the Internet, as long as information can be transmitted and received.

Figure 2:
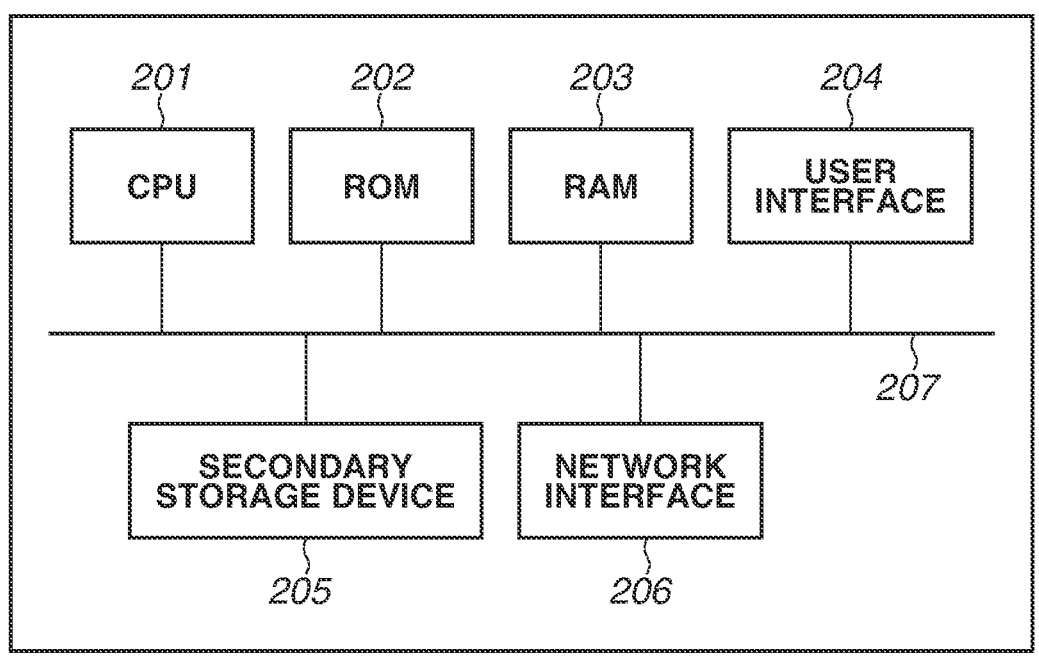
FIG. 2 is a block diagram illustrating a hardware module configuration of a server and a client personal computer (PC).

FIG. 2 is a block diagram illustrating a hardware module configuration of the server 101 and the client PC 102.

A central processing unit (CPU) 201 executes a program read from a read only memory (ROM) 202, a random access memory (RAM) 203, and a secondary storage device 205, and exchanges data with the components.

The ROM 202 stores a program to be operated on the server 101 and the client PC 102 and data.

The RAM 203 is a temporary memory area.

A user interface 204 inputs and outputs information and signals by using a display, a keyboard, a mouse, a touch panel, a button, a speaker, etc.

The secondary storage device 205 is typically a hard disk drive (HDD) or a flash memory.

A network interface 206 connects to the network 106 such as a LAN to communicate with other devices and transmit/receive data.

The CPU 201, the ROM 202, the RAM 203, the user interface 204, the secondary storage device 205, and the network interface 206 are connected to one another via a network 207.

Figure 3:
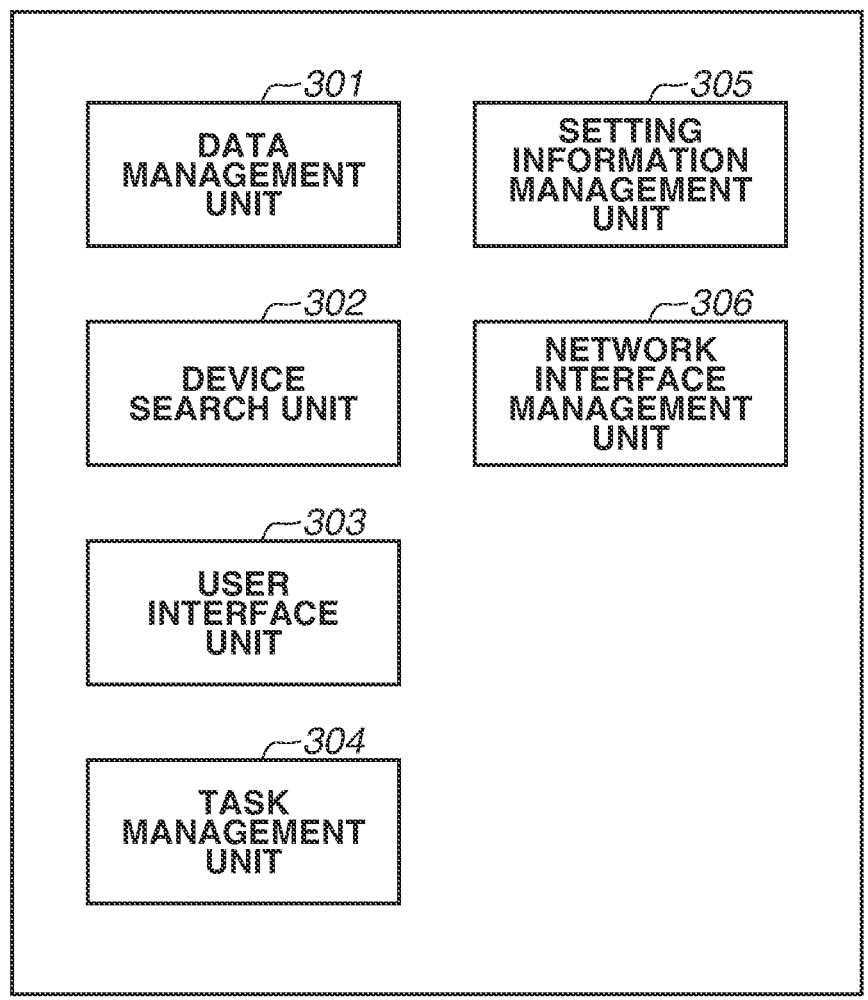
FIG. 3 is a block diagram illustrating a module configuration of a management application.

FIG. 3 is a block diagram illustrating a software module configuration of the management application.

The management application is implemented when the CPU 201 of the server 101 loads the management application from the ROM 202 or the secondary storage device 205 into the RAM 203 and executes the management application.

Each software module of the management application performs the processing described below.

A data management unit 301 stores various data groups, primarily setting information on the device managed by the management application, in the secondary storage device 205 of the server 101 and manages the data groups in an integrated manner.

A device search unit 302 checks whether a device manageable by the management application is present on the network 106 at an arbitrary timing. A result of the checking is stored in a device information table 400 described below.

A user interface unit 303 controls the user interface 204 of the server 101 and serves as an interface between the management application and the user using the management application.

A task management unit 304 instructs the setting information management unit 305 to execute a task in accordance with the schedule set in the task. A task is created when the user using the management application operates the user interface 204 of the server 101.

A setting information management unit 305 acquires information such as setting information, address book information, or section management information from the device, and transfers the information to the data management unit 301. The setting information management unit 305 also extracts the information from the data management unit 301, and distributes the information to the device.

A network interface management unit 306 manages and controls the network interface 206 of the server 101 to communicate with the client PC 102, the devices 103 to 105 on the network.

In the description below, the management application exchanges various types of information with the devices 103 to 105 via the network 106, and the network interface management unit 306 controls the communication used for exchange of the information unless otherwise described.

Although the management application includes other modules that are not illustrated, the description of the modules not used in the present exemplary embodiment is omitted.

Figure 4:
FIG. 4 illustrates a device information table of a device managed by the management application.

FIG. 4 illustrates the device information table 400 collectively storing various types of information (e.g., name and status) on the devices managed by the management application.

The device information table 400 is stored in the RAM 203 or the secondary storage device 205 of the server 101 and is referred to by various functional blocks illustrated in FIG. 3 as appropriate.

As described above, the information on the device searched by the device search unit 302 at an arbitrary timing is stored in the device information table 400.

Specifically, the device information table 400 mainly stores the information described below.

A column 401 stores an identifier (ID) assigned to each device managed by the management application.

Although FIG. 1 illustrates the three devices 103 to 105 according to the present exemplary embodiment, the table of FIG. 4 illustrates an example where eight devices are managed.

A column 402 indicates the name of a managed device. A column 403 indicates the internet protocol (IP) address of a managed device. A column 404 indicates the status of a managed device. A column 405 indicates the media access control (MAC) address of a managed device.

For example, when the device search unit 302 searches for a device, the device search unit 302 reads a management information base (MIB) of the device by using the Simple Network Management Protocol (SNMP) for the device, thereby acquiring various types of information, such as the pieces of information in the columns 402, 403, and 405 from the MIB. The effect of the present exemplary embodiment is not affected by the method for acquiring various types of information on the managed devices irrespective of the system or form used for the method.

Information transmitted from the managed device is received by the management application, and the result is stored in the device information table 400 as information indicating the status of a device in the column 404. For example, the expansion of Service Location Protocol (SLP) allows the device to notify the management application of the server 101 of a change in the status of the device via the network 106 on a regular basis. Alternatively, it is also possible to employ a mechanism for notifying the server 101 of the status of the device on a regular basis by using any method other than SLP.

Figure 5:
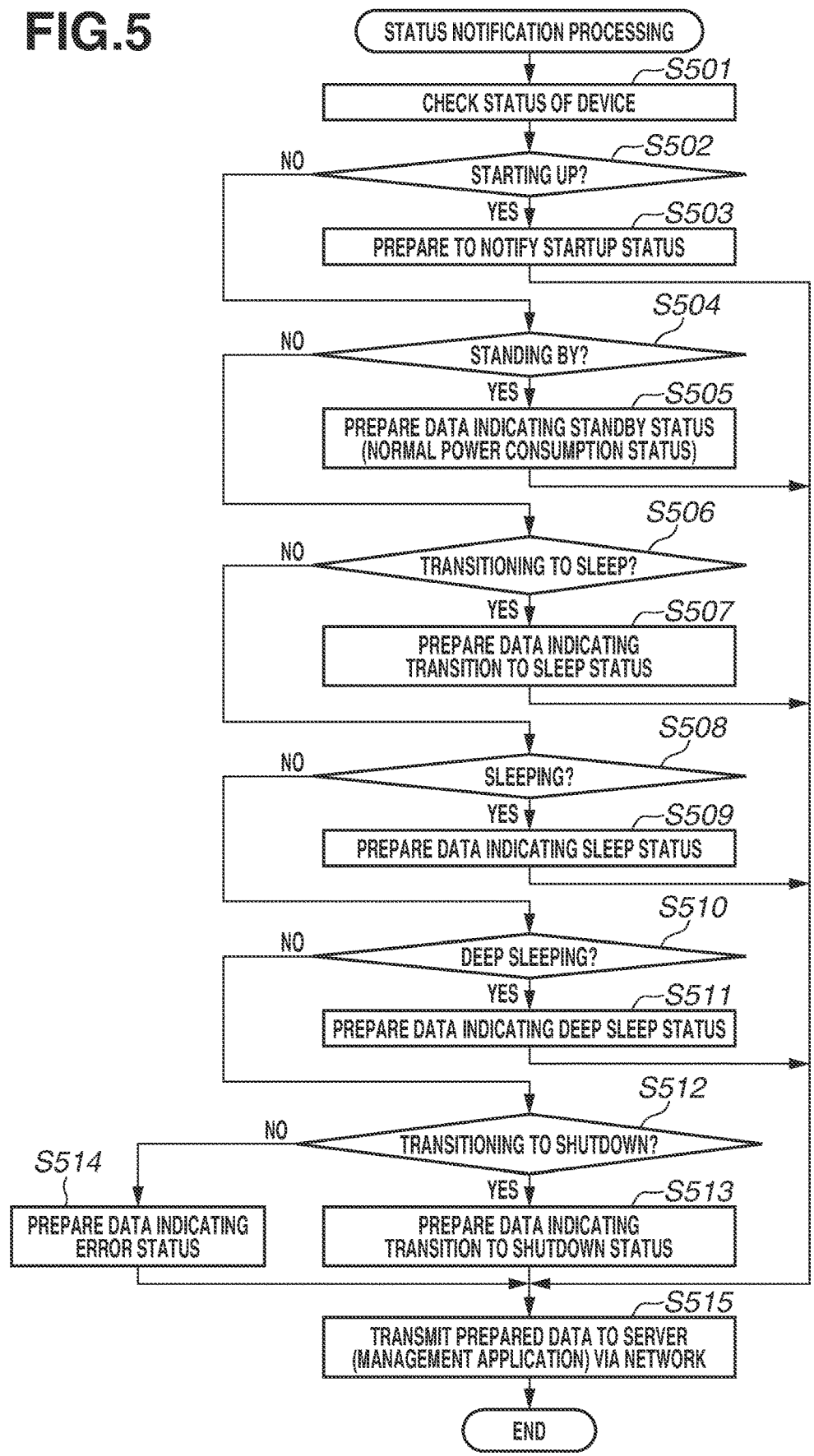
FIG. 5 is a flowchart illustrating status notification processing for notifying a status of the device managed by the management application.

Here, with reference to the flowchart in FIG. 5, a flow of processing performed by each of the devices 103 to 105 that are managed by the management application to notify the management application of the status of the device is described. The operation illustrated in the flowchart is merely a conceptual description of an operation performed on the device side. Therefore, the operation is not necessarily described in association with any specific hardware module configuration or functional configuration on the device side, and it is assumed that processing in each step is performed by any configuration of the device.

First, in step S501, each of the devices 103 to 105 checks the status of its own. Subsequently, in step S502, each of the devices 103 to 105 determines whether the status checked in step S501 indicates that the device is starting up (in the period from power-on to the standby status). In a case where it is determined that the status of the device indicates that the device is starting up (Yes in step S502), then in step S503, the device (devices 103 to 105) makes preparations for the notification of a startup status. Examples of such preparations include processing for preparing data indicating the startup status and storing the data in a predetermined location in the device (devices 103 to 105). The predetermined location refers to a storage unit (not illustrated) such as a RAM or an HDD of each of the devices 103 to 105. The above processing is similar to processing for making preparations for other statuses described below.

In a case where it is determined that the status of the device does not indicate that the device is starting up (No in step S502), the device (devices 103 to 105) determines the status of its own in subsequent processing in steps S504, S506, S508, S510, and S512.

When a result of the determination indicates any of a "standby status (normal power state)", a "transition to sleep status", a "sleep status", a "deep sleep status", and a "transition to shutdown status", data indicating the corresponding status is prepared. Preparation of the data indicating the respective statuses is performed in steps S505, S507, S509, S511, and S513.

The standby status refers to a power state of the device in which a predetermined task is executable. The sleep status and the deep sleep status refer to power states of the device in which a predetermined task is not executable and are also referred to as a power saving state. The power saving state refers to a state where power supplied to a device is lower than in the normal power state.

In a case where it is determined that the device is not "transitioning to shutdown" (No in step S512), the device (devices 103 to 105) determines that some error has occurred in the device (devices 103 to 105) and, then in step S514, prepares data indicating the error status.

Finally, in step S515, the device (devices 103 to 105) transmits the data indicating the status which is prepared in accordance with each determination result to the management application of the server 101 via the network 106. The protocol for transmitting the status to the server 101 may be the above-described SLP, or any other method may be used. The "standby status (normal power state)" includes a state in which the device (devices 103 to 105) is executing a job, e.g., a print job, and the job execution status is also treated as the standby status according to the present exemplary embodiment. The device information table 400 stores the information indicating the device status transmitted in step S515.

Although the entire processing illustrated in the flowchart of FIG. 5 is not to be repeatedly performed, it is assumed that the device operates at a certain timing and regularly transmits the status of the device to the management application of the server 101.

Figure 6A:
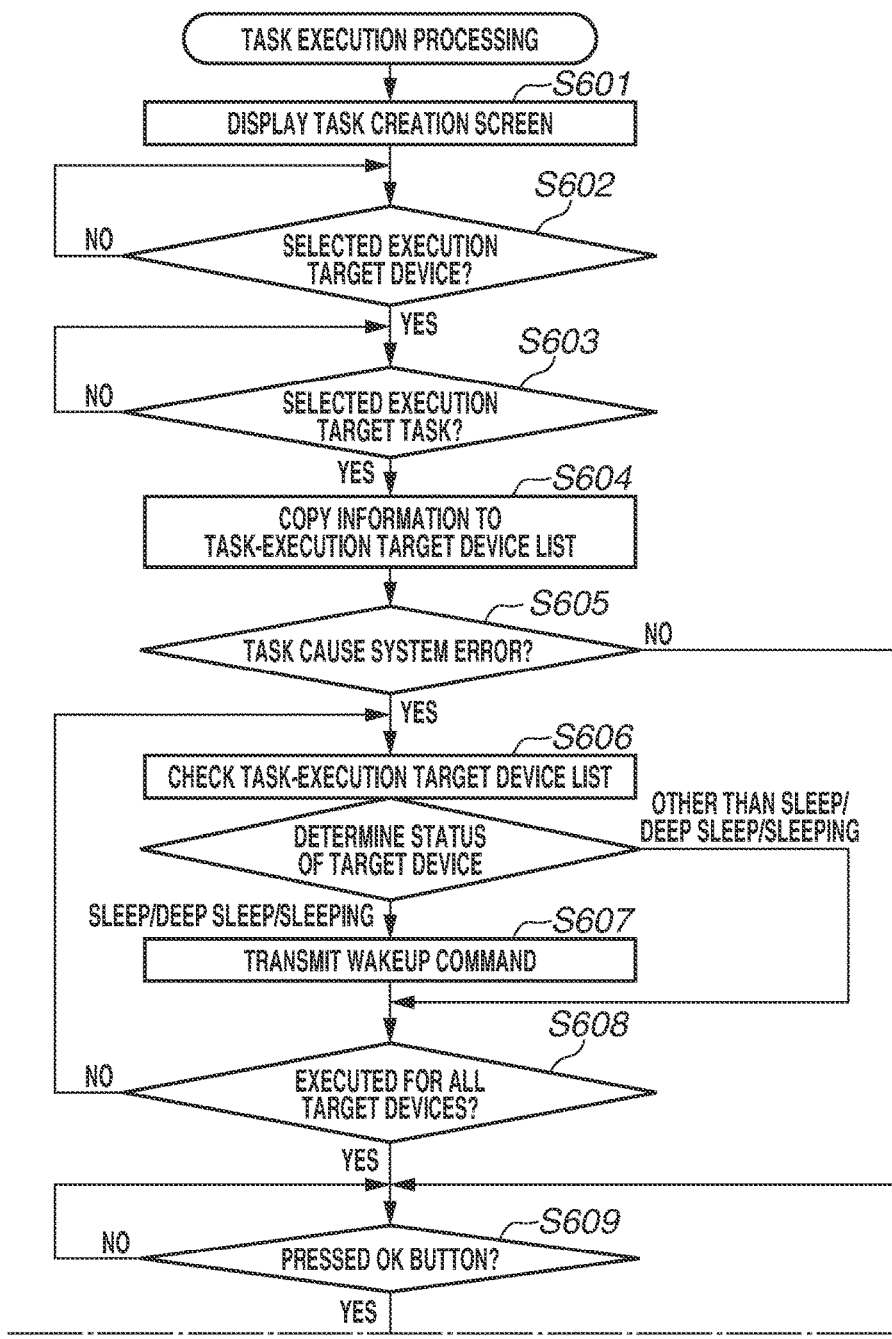
FIG. 6 that is composed of FIGS. 6A and 6B is a flowchart illustrating task execution processing performed by the management application.
Figure 6B:
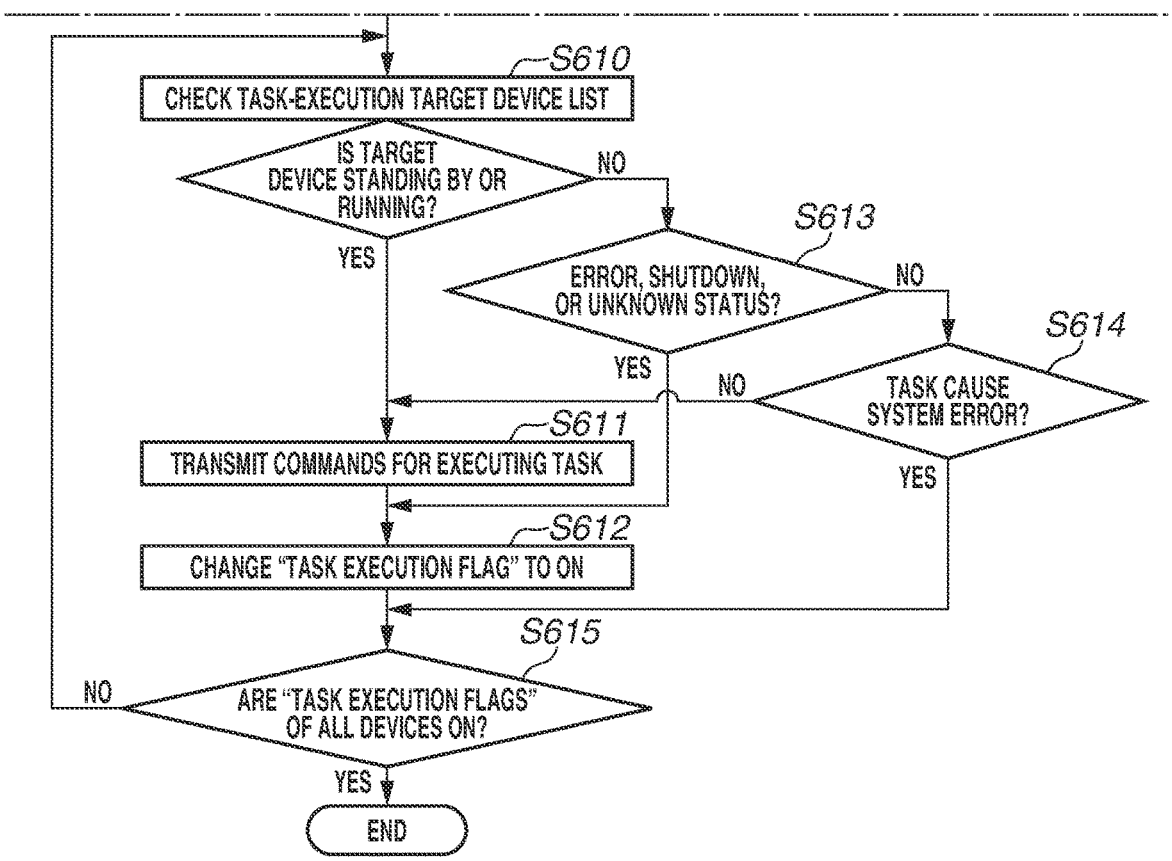

Next, with reference to the flowchart of FIG. 6 composed of FIGS. 6A and 6B, the processing performed by the management application to execute a task will be described. The task described here refers to processing performed by the management application for distributing the setting information on the device, the address book information, the section management information, etc., to the devices 103 to 105 and acquiring the above-described information from the device side in an opposite manner.

The processing is implemented by the CPU 201 of the server 101 when the CPU 201 loads a program from the ROM 202 or the secondary storage device 205 into the RAM 203 and executes the loaded program. In the description of the flow of processing below, the processing is implemented by the same operation as described above unless otherwise described.

First, in step S601, the management application displays a task creation screen (FIG. 7A) on a display of the server 101 by controlling the user interface 204, using the user interface unit 303.

The task creation screen (FIG. 7A) has such a configuration that the target device in which a task is to be executed is selected and the type of the task to be executed is determined.

Subsequently, in steps S602 and S603, the management application waits until one or more execution target devices and the type of the task to be executed are selected on the task creation screen (FIG. 7A).

Specifically, the management application waits until an OK button on the task creation screen (FIG. 7A) is pressed after a check box for the task-execution target device and a check box for the task to be executed are selected on the task creation screen. Although there is also processing for canceling execution of the task, the part related to the cancel processing is omitted from the description of the present exemplary embodiment. Here, a device to which the instruction for executing predetermined processing is transmitted is selected as a transmission destination. As illustrated on the task creation screen (FIG. 7A), examples of the task to be executed include processing for distributing the setting information, processing for acquiring the setting information, processing for distributing the address book, processing for acquiring the address book, the processing for adding the section management information, and processing for deleting the section management information.

Subsequently, the management application presents a task execution screen 1 (FIG. 7B) and confirms whether selections are correctly made on the task creation screen (FIG. 7A). When the OK button is pressed on the task execution screen 1, the management application then presents a task execution screen 2 (FIG. 7C).

On the task execution screen 2 (FIG. 7C), a timing for executing the task is selected, or a specific execution time is input. The timing input on the task execution screen 2 (FIG. 7C) is stored by the task management unit 304.

Subsequently, in step S604, the management application copies information on each of the devices checked and input as the task-execution target devices on the task creation screen (FIG. 7A) from the device information table 400 into a task-execution target device list 900 (FIG. 9). The information copied from the device information table 400 to the task-execution target device list 900 includes the ID, the name, the address, and the MAC address of each task-execution target device.

FIG. 9 illustrates the task-execution target device list 900 after the above-described information is copied thereinto. A column 901 of a "task execution flag" in the task-execution target device list 900 stores information indicating whether the task has been executed for each device, which will be described below.

Although FIG. 9 illustrates the state where the "task execution flag" of the device with the ID "1" is ON, the "task execution flags" of all the devices are initialized to be OFF immediately after the information is copied from the device information table 400 during the processing in step S604.

Subsequently, in step S605, the task management unit 304 checks the type of task selected in step S603. Although not illustrated, the task management unit 304 stores the information on the task (i.e., information about the type of task) selected in step S603 in a predetermined location of the RAM 203 or the secondary storage device 205.

In step S605, more specifically, the task management unit 304 determines whether the type of task selected in step S603 is a predetermined task that can greatly affect the task-execution target device when the task is executed when returning from sleep or during sleep. For example, when the task to add the section management information (or delete the section management information) is performed when the device is returning from sleep or during sleep, a system error may occur in the device. Therefore, for example, the task to add the section management information is treated as a predetermined task that is to be executed in consideration of the status of the device. To check the type of task as described above, the management application stores information used for the checking (e.g., information such as a list of tasks that can greatly affect the device) in a table (not illustrated) and compares the type of task with the list.

In a case where it is determined that the type of task selected in step S603 is not a task that can greatly affect the task-execution target device when the task is executed during return from sleep or during sleep (No in step S605), the processing proceeds to step S609. On the other hand, in a case where it is determined that the type of task selected in step S603 is a task that can greatly affect the task-execution target device when the task is executed during return from sleep or during sleep (Yes in step S605), the processing proceeds to step S606. In step S606, a status of each of the task-execution target devices is sequentially checked using the task-execution target device list 900. At this time, based on a value in the "ID" column in the task-execution target device list 900, the task management unit 304 checks a status of the task-execution target device by reference to the "status" column 404 in the row of the corresponding ID in the device information table 400.

Subsequently, in a case where the status of the task-execution target device indicates "Deep Sleep", "Sleep" or "Sleeping", the processing proceeds to step S607. In step S607, a wakeup command is transmitted to the task-execution target device to command to return from sleep to stand by.

The wakeup command is issued and transmitted by the task management unit 304 to the target device via the network interface 206 and the network 106. Neither the content of the wakeup command nor the method for transmitting the wakeup command to the device affects the effect of the present exemplary embodiment irrespective of the format or communication system used, so that the detailed description thereof is omitted.

In step S608, the task management unit 304 confirms whether the processing in steps S606 and S607 has been executed for all the devices listed in the task-execution target device list 900. In a case where it is determined that the processing in steps S606 and S607 has been executed for all the devices listed in the task-execution target device list 900 (Yes in step S608), the processing proceeds to step S609. In a case where there are still device for which the processing is to be performed (No in step S608), the processing returns to step S606 to repeat the processing.

In step S609, the management application confirms whether the OK button has been pressed on the task execution screen 2 (FIG. 7C) and waits until the OK button is pressed. In a case where it is determined that the OK button has been pressed (Yes in step S609), the processing proceeds to step S610. In a case where it is determined that the OK button has not been pressed (No in step S609), the management application repeats the determination processing in step S609. At this time, in a case where task execution time and date are input on the task execution screen 2 (FIG. 7C), the processing does not proceed to step S610. Instead, the task management unit 304 schedules the processing in step S610 and subsequent steps to be performed at the input date and time, and then the processing in the flowchart of FIG. 6 is ended. Since the processing for the scheduling does not affect the effect of the present exemplary embodiment, the description thereof is omitted.

In step S610, the task-execution target device list 900 is first checked from the top, and the processing is performed on the device of which the value of "task execution flag" is OFF.

When the task-execution target device list 900 is created in step S604, all the "task execution flags" are initialized to be OFF. In other words, the processing in step S610 is performed on a device at the beginning of the list when the processing is performed for the first time.

In step S610, checking of a status is performed on a device of which the "task execution flag" indicates OFF. As with the processing in step S606, the processing for checking a status in step S610 is performed by reference to the "status" column 404 in the row of the corresponding ID in the device information table 400 of FIG. 4.

In a case where the status of the device is "Standby" or "Running" (Yes in step S610), the processing proceeds to step S611. In step S611, the commands for executing the task selected in step S603 are transmitted to the target device.

In response to the command given by the task management unit 304 to the setting information management unit 305, the setting information management unit 305 executes the task. To transmit the setting information, the address book information, the section management information to the device, the setting information management unit 305 receives the pieces of information from the data management unit 301 and transmits the pieces of information to the device. In contrast to this, in a case where the setting information management unit 305 acquires the pieces of information from the device, the setting information management unit 305 transfers the acquired information to the data management unit 301, and the data management unit 301 then stores the information in the secondary storage device 205 of the server 101. The effect of the present exemplary embodiment is not affected by the processing for transmitting the commands for executing the task nor the processing for acquiring the information from the device irrespective of the format or communication system used, so that the detailed description thereof is omitted.

In step S612, after the commands for executing the task are transmitted to the target device, the task management unit 304 sets the "task execution flag" of the device to which the commands have been transmitted in the task-execution target device list 900 to be ON.

In a case where the status of the device is not "Standby" or "Running" (No in step S610), the processing proceeds to step S613. In step S613, it is determined whether the status of the device is "Error", "Shutdown" or "Unknown". In a case where the status of the device is any of the foregoing statuses (Yes in step S613), the task management unit 304 cannot execute the task, and therefore the processing proceeds to step S612. In step S612, the "task execution flag" of the device in the task-execution target device list 900 is changed to ON. In a case where it is determined that the status of the device is not any of "Error", "Shutdown" or "Unknown" (No in step S613), the processing proceeds to step S614. In step S614, the same determination processing as in step S605 is made again.

In step S614, as in step S605 described above, it is determined whether the type of the task to be executed is a task that can greatly affect the task-execution target device when the task is executed during return from sleep. In a case where it is determined that the type of the task to be executed is a task that can greatly affect the task-execution target device when the task is executed during return from sleep (Yes in step S614), the processing proceeds to step S615. When it is determined that the type of task to be executed is not a task that can greatly affect the task-execution target device when the task is executed during return from sleep (No in step S614), the processing proceeds to step S611.

In step S615, it is determined whether "task execution flags" of all the devices in the task-execution target device list 900 are ON. In a case where it is determined that the "task execution flags" of all the devices in the task-execution target device list 900 are ON (Yes in step S615), the task execution processing ends. When it is determined that the "task execution flags" of all the devices in the task-execution target device list 900 are ON (No in step S615), the processing returns to step S610 so that the processing is repeatedly performed.

The management application presents a task-in-execution screen (FIG. 8A) on a display (not illustrated) of the server 101 when the processing in step S610 is first started.

In a case where there is a remaining device to which the command for executing the task cannot be transmitted in step S611 while the processing in steps S610 to S615 is repeated, the management application presents the number of the remaining devices on a task-in-execution screen (FIG. 8B).

As described above, it is possible to prevent the situation where a system error occurs in the device during execution of a task even when the management application executes the task while the device is in a sleep state.

In the above-described technique discussed in Japanese Patent Application Laid-Open No. 2014-106834, it is also possible that a user executes a desired process (importing, etc.) on the device immediately after a command for disabling the power saving mode is transmitted. In such a case, the device side starts the subsequent processing almost at the same time as receipt of the command for disabling the power saving mode, and therefore the operation is similar to that in a case where a command is not received. At this time, the device simultaneously performs the processing for returning from the power saving mode to the standby status and another processing received from the device management application, which may lead to an error in some cases.

According to the present exemplary embodiment, the device does not simultaneously perform the processing for returning from the power saving mode to the standby status and another processing received from the device management application in the foregoing case, whereby it is possible to produce an effect of solving the issue of a possible error in the device.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-199102, filed Oct. 31, 2019, which is hereby incorporated by reference herein in its entirety.

What is claimed is:

1. A non-transitory computer readable storage medium on which is stored a computer program for making a computer execute a method for an apparatus, the method comprising:
transmitting a command for executing a task to a plurality of devices to be managed; and
checking a status of one of the plurality of devices in a case where the task to be executed in the one of the plurality of devices is a predetermined task that is likely to cause a system error in the one of the plurality of devices,
wherein a command for executing the predetermined task is transmitted to a first device determined to be in a state where the predetermined task is executable, among the plurality of devices, without transmission of a command for causing the one of the plurality of devices to be in the state where the predetermined task is executable, and
wherein the command for executing the predetermined task is transmitted to a second device determined to be in a state where the predetermined task is not executable, among the plurality of devices, after transmission of the command for causing the one of the plurality of devices to be in the state where the predetermined task is executable.

2. The non-transitory computer readable storage medium according to claim 1, further comprising receiving pieces of information indicating statuses of the plurality of devices from the plurality of devices,
wherein the statuses of the plurality of devices are checked based on the received pieces of information.

3. The non-transitory computer readable storage medium according to claim 1, further comprising selecting, from the plurality of devices, one or more devices to which the command for executing the predetermined task is to be transmitted,
wherein, in a case where the task to be executed in a device is a predetermined task that is to be executed in consideration of a status of the device, statuses of the one or more devices selected from the plurality of devices are checked.

4. The non-transitory computer readable storage medium according to claim 1,
wherein the state where the predetermined task is executable is a normal power state, and
wherein the state where the predetermined task is not executable is a power saving state where power supplied to a device is lower than in the normal power state.

5. A non-transitory computer readable storage medium on which is stored a computer program for making a computer execute a method for an apparatus, the method comprising:
transmitting a command for executing a task for processing to add section management information to a first device determined to be in a state where the task for the processing to add the section management information is executable, among a plurality of devices to be managed, without transmission of a command for causing the first device to be in the state where the task for the processing to add the section management information is executable; and
transmitting the command for executing the task for the processing to add the section management information to a second device determined to be in a state where the task for the processing to add the section management information is not executable, among the plurality of devices, after transmission of the command for causing the second device to be in the state where the task for the processing to add the section management information is executable.

6. A method comprising:
transmitting a command for executing a task to a plurality of devices to be managed; and
checking a status of one of the plurality of devices in a case where the task to be executed in the one of the plurality of devices is a predetermined task that is likely to cause a system error in the one of the plurality of devices,
wherein a command for executing the predetermined task is transmitted to a first device determined to be in a state where the predetermined task is executable, among the plurality of devices, without transmission of a command for causing the one of the plurality of devices to be in the state where the predetermined task is executable, and
wherein the command for executing the predetermined task is transmitted to a second device determined to be in a state where the predetermined task is not executable, among the plurality of devices, after transmission of the command for causing the one of the plurality of devices to be in the state where the predetermined task is executable.

7. The method according to claim 6, further comprising receiving pieces of information indicating statuses of the plurality of devices from the plurality of devices,
wherein the statuses of the plurality of devices are checked based on the received pieces of information.

8. The method according to claim 6, further comprising selecting, from the plurality of devices, one or more devices to which the command for executing the predetermined task is to be transmitted,
wherein, in a case where the task to be executed in a device is a predetermined task that is to be executed in consideration of a status of the device, statuses of the one or more devices selected from the plurality of devices are checked.

9. The method according to claim 6,
wherein the state where the predetermined task is executable is a normal power state, and
wherein the state where the predetermined task is not executable is a power saving state where power supplied to a device is lower than in the normal power state.

10. A system comprising:
one or more processors; and
one or more memories coupled to the one or more processors, that execute by the one or more processors a set of instructions to:
transmit a command for executing a task to a plurality of devices to be managed; and
check a status of one of the plurality of devices in a case where the task to be executed in the one of the plurality of devices is a predetermined task that is to be executed in consideration of the status of the one of the plurality of devices,
wherein a command for executing the predetermined task is transmitted to a first device determined to be in a state where the predetermined task is executable, among the plurality of devices, without transmission of a command for causing the one of the plurality of devices to be in the state where the predetermined task is executable, and
wherein the command for executing the predetermined task is transmitted to a second device determined to be in a state where the predetermined task is not executable, among the plurality of devices, after transmission of the command for causing the one of the plurality of devices to be in the state where the predetermined task is executable.

11. The system according to claim 10,
wherein the one or more memories that further execute, by the one or more processors, the set of instruction to receive pieces of information indicating statuses of the plurality of devices from the plurality of devices,
wherein the statuses of the plurality of devices are checked based on the received pieces of information.

12. The system according to claim 10, wherein the one or more memories that further execute, by the one or more processors, the set of instruction to select, from the plurality of devices, one or more devices to which the command for executing the predetermined task is to be transmitted,
wherein, in a case where the task to be executed in a device is a predetermined task that is to be executed in consideration of a status of the device, statuses of the one or more devices selected from the plurality of devices are checked.

13. The system according to claim 10,
wherein the state where the predetermined task is executable is a normal power state, and
wherein the state where the predetermined task is not executable is a power saving state where power supplied to a device is lower than in the normal power state.

* * * * *